United States Patent
Broerman et al.

(10) Patent No.: US 7,587,028 B1
(45) Date of Patent: Sep. 8, 2009

(54) METHOD AND APPARATUS FOR GENERATING AND PLAYING DIAGNOSTIC MESSAGES INDICATIVE OF MTA PROVISIONING STATUS

(75) Inventors: Keith Robert Broerman, Carmel, IN (US); Glen Wakeman Ruch, Indianapolis, IN (US); Blaine Edward Ramey, Indianapolis, IN (US); David Brian Baehl, Indianapolis, IN (US)

(73) Assignee: Thomson Licensing, Boulogne Billancourt (FR)

( * ) Notice: Subject to any disclaimer, the term of this patent is extended or adjusted under 35 U.S.C. 154(b) by 475 days.

(21) Appl. No.: 10/533,978

(22) PCT Filed: Nov. 12, 2003

(86) PCT No.: PCT/US03/36320

§ 371 (c)(1),
(2), (4) Date: May 5, 2005

(87) PCT Pub. No.: WO2004/045130

PCT Pub. Date: May 27, 2004

Related U.S. Application Data

(60) Provisional application No. 60/425,382, filed on Nov. 12, 2002.

(51) Int. Cl.
*H04M 1/24* (2006.01)
*H04M 3/08* (2006.01)
*H04M 3/22* (2006.01)

(52) U.S. Cl. .................. 379/15.03; 379/1.01; 379/29.1; 379/31; 370/241

(58) Field of Classification Search ................ 379/1.01, 379/15.03, 21, 26.01, 26.02, 29.01, 29.08, 379/31, 201.12, 29.1, 207.04, 207.08, 257; 370/241, 252

See application file for complete search history.

(56) References Cited

U.S. PATENT DOCUMENTS

| 5,062,131 | A | * | 10/1991 | Kanare et al. ................. 379/33 |
|---|---|---|---|---|
| 5,146,488 | A | | 9/1992 | Okada et al. |
| 5,150,402 | A | | 9/1992 | Yamada |
| 5,903,626 | A | | 5/1999 | Iglehart et al. |

(Continued)

FOREIGN PATENT DOCUMENTS

EP 1 235 416 A1 8/2002

(Continued)

OTHER PUBLICATIONS

Search Report dated Apr. 23, 2004.

(Continued)

*Primary Examiner*—Quoc D Tran
(74) *Attorney, Agent, or Firm*—Robert D. Shedd; Paul P. Kiel

(57) ABSTRACT

A method and an apparatus, which generates and plays diagnostic messages indicative of a media terminal adaptor provisioning status. The media terminal adaptor detects errors in its provisioning status or an out-of-service state. Thus, when the telephone connected to the media terminal adaptor is taken off-hook and the media terminal adaptor that is not provisioned, improperly provisioned, or placed in an out-of-service state by the service provider, the media terminal adaptor will generate an appropriate diagnostic audio voice message or tone sequence to the telephone instructing the listener on how to proceed in order to resolve the problem.

20 Claims, 1 Drawing Sheet

U.S. PATENT DOCUMENTS

| | | | |
|---|---|---|---|
| 5,917,807 A | 6/1999 | Lee et al. | |
| 6,018,567 A | 1/2000 | Dulman | |
| 6,246,671 B1 | 6/2001 | Lattanzi et al. | |
| 6,654,722 B1 | 11/2003 | Aldous et al. | |
| 2002/0080930 A1* | 6/2002 | Cho | 379/90.01 |
| 2002/0114439 A1 | 8/2002 | Dunlap | |
| 2002/0159577 A1* | 10/2002 | Vardi et al. | 379/201.01 |

FOREIGN PATENT DOCUMENTS

| | | |
|---|---|---|
| JP | 5-161183 | 6/1993 |
| JP | 6-164882 | 6/1994 |
| JP | 6-223272 | 8/1994 |
| JP | 6-225069 | 8/1994 |
| JP | 6-276233 | 9/1994 |
| JP | 7-261835 | 10/1995 |
| JP | 10-269107 | 10/1998 |
| JP | 2000-106573 | 4/2000 |
| JP | 2000-315289 | 11/2000 |
| JP | 2000-339289 | 12/2000 |
| JP | 2000-354111 | 12/2000 |
| JP | 2001-223764 | 8/2001 |
| JP | 2001-223795 | 8/2001 |
| JP | 2002-57724 | 2/2002 |

OTHER PUBLICATIONS

"Access and Terminals (AT); Digital Broadband Cable Access to the Public Telecommunications Network; IP Multimedia Time Critical Services; Part 6: Media Terminal Adapter (MTA) device provisioning; ETSI TS 101 909-6" ETSI Standards, European Telecommunications Standards Institute, Sophia-Antipo, FR, vol. AT-Digital, No. V111, Jun. 2001, XP014006808 ISSN: 0000-0001.

Supplemental European Search Report—dated Feb. 3, 2006.

* cited by examiner

METHOD AND APPARATUS FOR GENERATING AND PLAYING DIAGNOSTIC MESSAGES INDICATIVE OF MTA PROVISIONING STATUS

This application claims the benefit, under 35 U.S.C. § 365 of International Application PCT/US03/36320, filed Nov. 12, 2003, which was published in accordance with PCT Article 21(2) on May 27, 2004 in English and which claims the benefit of U.S. provisional patent application No. 60/425,382, filed Nov. 12, 2002.

FIELD OF THE INVENTION

The present invention relates to cable modems with embedded media terminal adaptors, and more particularly, to a media terminal adaptor (MTA) that determines provisioning failure or an out-of-service condition and generates an appropriate diagnostic audio voice message or tone sequence through a telephone handset instructing the listener on how to proceed in order to resolve the provisioning failure or the out-of-service condition.

BACKGROUND OF THE INVENTION

Media terminal adaptors (MTAs) are used to convert digital data to analog audio for telephones. MTAs require a strict provisioning sequence prior to becoming operational. In a PacketCable environment a total of 25 steps must be complete to become operational, and 11 additional steps must be completed in order to establish security associations with the call agent. These provisioning steps are controlled by the Multiple Service Operator (MSO) or Internet Service Provider (ISP) and are a function of the MSO Provisioning Server (MTA dynamic host configuration protocol (DHCP) options and MTA configuration file), the service provider's domain name system (DNS) configuration, and the configuration of the service provider call agent and Kerberos Key Distribution Center (KDC). Failure to properly configure any of these items can leave the MTA in a non-provisioned or improperly configured state which will render the MTA nonfunctional or out-of-service. In this context, out-of-service means that dial tone is not heard on the handset when the phone attached to the MTA is taken off-hook.

Existing cable modems and MTAs use discrete light emitting diodes (LEDs) or a 7-segment LED display to indicate provisioning status and possibly, the first provisioning step that has failed. Due to the small number of product LEDs (typically 5, 6, or 7-segment display) and the large number of provisioning steps, it is difficult to indicate the precise cause of a provisioning failure. Approaches have been used to display the provisioning status via blinking LEDs, displaying the status code in a binary format, etc. Many non-technical consumers are not able to easily correlate the blinking LED codes with a table in the user manual in order to resolve their specific problem.

As can be appreciated, there is a need for a MTA that provides a diagnostic audio message that is easily understandable to the user of the MTA when a there is a provisioning failure or out-or-order condition. Additionally, there is a need to provide a message to the user that the user can easily understand with regard to correcting the provisioning failure or out-of-order condition.

SUMMARY OF THE INVENTION

In accordance with the present invention, if a phone is taken off-hook on a MTA that is not provisioned, improperly provisioned, or placed in an out-of-service state such as by the service provider, the MTA will generate an appropriate diagnostic audio voice message or tone sequence to the telephone informing the user of the failure or out-of-order condition and instructing the listener on how to proceed in order to resolve the problem.

DETAILED DESCRIPTION OF THE PRESENT INVENTION

Figure 1:
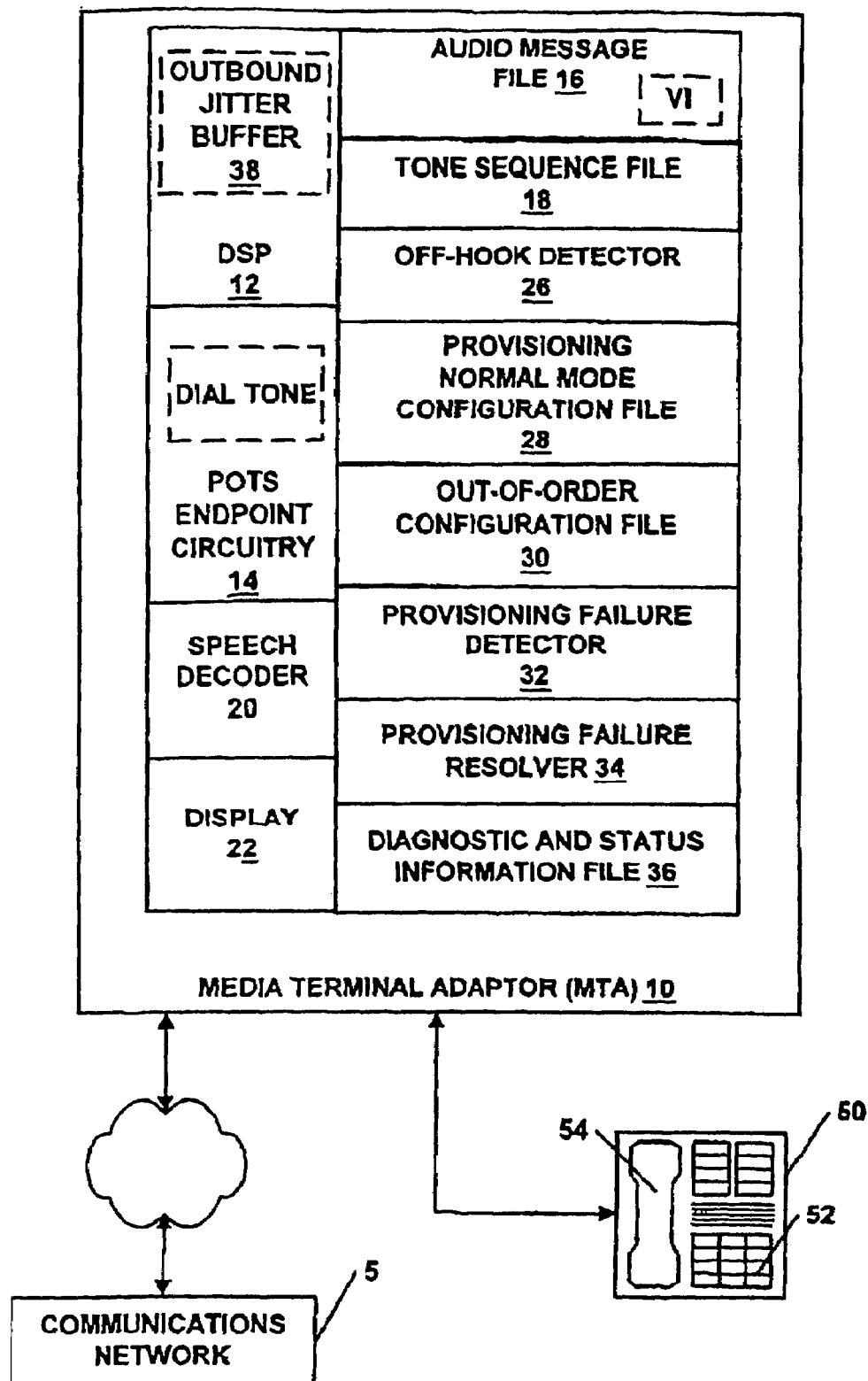
FIG. 1 illustrates a general block diagram of a media terminal adaptor (MTA) in accordance with the present invention.

The present invention provides several methods to indicate to the user in a readily understandable manner that the MTA 10 has not been properly configured and the steps the user should take to correct the condition, for example, by contacting their service provider to resolve the issue. These methods involve playing an audio sequence consisting of a voice message and/or a sequence of audio tones to indicate the specific problem and what to do to resolve the issue.

The communications by MTA 10, like cable modems, with a communications network 5, such as without limitation an Internet protocol based cable network, is well known. Therefore, no further description as related to such communications of the MTA 10 with a communications network 5 is needed. However, for the sake of facilitating an understanding of certain aspects of the present invention, an explanation of the MTA 10 in accordance with the present invention is described herein below.

Referring now to FIG. 1, the MTA 10 of the present invention includes a digital signal processor (DSP) 12 and plain old telephone service (POTS) endpoint circuitry 14, speech decoder 20 and display 22. The DSP 12 includes an input jitter buffer 38. The MTA 10 stores audible and/or DTMF tone sequences in a tone sequence file 18 and audio messages in an audio message file 16.

The MTA 10 also accesses a normal mode configuration file 28 for operating the MTA when properly provisioned, an out-of-service configuration file 30 which enables the service provider to place the MTA 10 out-of-service, a provisioning failure detector 32 and provisioning failure resolver 34. As can be appreciated, the normal mode configuration file 28 defines the operational protocol of a properly provisioned MTA 10 to communicate with the communications network 5 to which it is attached.

The MTA 10 uses discrete LEDs or a 7-segment LED display 22 to indicate provisioning status and possibly, the first provisioning step that has failed, as determined by the provisioning failure detector 32. Display 22 may be used to display the provisioning status via blinking LEDs, displaying the status code in a binary format, etc. In the present invention, the MTA 10 also generates an audible diagnostic message to the user, over the attached telephone(s) 50 via handset 54, indicating: 1) the presence of a provisioning error, as determined by the provisioning failure detector 32; 2) the nature of the error (which provisioning step failed); and 3) what step should be taken to resolve the error, as determined by the provisioning failure resolver 34. For example, the error or failure detected by the provisioning failure detector 32 would be mapped to a resolution or corrective action to be taken by the user, as determined by the provisioning failure resolver 34. Such corrective action would be provided to the user/listener in the form of an audible message. The user may be directed to receive the diagnostic message via handset 54 by, for example, an indication on MTA 10.

In the present invention, the audible message can consist of either a voice message stored in the audio message file 16 or a sequence of audio tones stored in the tone sequence file 18, or both. The voice message and/or audio tone sequence can be either canned (fixed, stored in local non-volatile memory) or dynamically generated. The audio clip could combine fixed voice audio with dynamically-generated voice audio such as a specific telephone number to dial. The variable information (VI) used to generate the dynamic portion of the message could be stored in non-volatile memory or passed to the MTA 10 via a proprietary configuration file TLV or management information base (MIB) element. In this way, the diagnostic message can be tailored for a specific service provider (service provider name and telephone number), location information, etc.

In addition to or alternately, a sequence of audio tones (including a 'beep' sequence or a series of DTMF tones or modem tones) stored in the tone sequence file 18 could be played to convey the diagnostic audible message. DTMF tones would be suitable for machine recognition, by, for example, test equipment used by a field technician. The MTA could detect whether the test equipment is connected, for example, by entering a tone mode using a predefined key sequence on the phone keypad.

In addition to or alternatively, the telephone keypad 52 can be used to request additional diagnostic or status information from a diagnostic and status information module 36. The generated audible message can prompt the user/listener to enter one or more keypad digits in order to retrieve more detailed diagnostic information or status information from such diagnostic and status information module 36. The MTA operating status information can include, without limitation, the current upstream and downstream frequency, power level, and signal to noise ratio.

The improved operation of the MTA 10 will now be described in detail. The MTA's DSP (digital signal processor) 12 and POTS endpoint circuitry 14 are enabled early in the boot-up sequence, prior to the start of the MTA's provisioning. If the MTA's provisioning is successful, the MTA 10 enters its normal operating mode. Thereby, when the user takes the phone handset off-hook, which is detected by the off-hook detector 26, the user/listener hears the dial tone. In other words, the POTS endpoint circuitry 14 sends an audio dial tone signal to the telephone 50.

On the other hand, if the MTA's provisioning was not successful or if the service provider placed the MTA in an out-of-service state via the MTA's out-of-service configuration file 30 or MTA's MIB element setting, as detected by the provisioning failure detector 32, the MTA 10 will play an appropriate diagnostic audio message (voice and/or tone sequence) when the user takes the phone off-hook, as detected by the off-hook detector 26.

As previously described, provisioning of the MTA 10 requires, without limitation, various steps to establish security associations with a call agent and those steps for establish communications with a service provider Provisioning Server using DHCP options, a service provider's DNS configuration, and the configuration of the service provider call agent and/or and the KDC. A few examples of errors or failures detected by the provisioning failure detector 32 would include whether: 1) the securing associations are established; 2) the DHCP options are defined; 3) the DNS configuration is defined; 4) the TFTP server configuration is defined; 5) the SNMP entity configuration is defined; 6) the Kerberos server configuration is defined; and 7) an out-of-service condition exists. Nevertheless, all steps required to make a MTA 10 operational with a communication network 5 would need to be checked for failure of any one provisioning step.

Regarding the message generation, the MTA 10 will generate audio message from the audio message file 16 or tone sequence file 18 by various techniques. One possible method is to encapsulate the audio in an RTP (real time protocol, RFC-1889/1890) packet stream to emulate the reception of said data from the communication network 5. In this example, the audio packet stream comprises an ordered sequence of near-synchronous RTP packets and is sent to the DSP 12 and the POTS endpoint circuitry 14. As with audio packets received from the communications network 5, the DSP 12 depacketizes the RTP packet stream having the audio data and places it in its inbound jitter buffer 38 for use by the speech decoder 20.

The message playing is effectuated as the speech decoder 20 converts the digital pulse code modulation (PCM) audio data to analog samples, which are reconstructed in the POTS endpoint circuitry 14 and played to the listener through the handset 54.

Thus, the DSP 12, POTS endpoint circuitry 14 and speech decoder 20 in combination with the audio message file 16 and tone sequence file 18 provide the means for generating and playing the provisioning error messages.

The existing POTS endpoint circuitry 14 and control software (off-hook detector 26) monitor the telephone's hook state and generate the diagnostic audio message when an off-hook condition is detected by lifting handset 54. As can be appreciated, conventionally, a telephone 50 can be taken off-hook by pressing a speakerphone button. Therefore, the diagnostic audio message would be played through the speaker on the base of the telephone 50.

Since there are numerous diagnostic audio messages, describing all possible messages is prohibitive. Therefore, a few examples of diagnostic audio messages are described in TABLE 1 below to permit understanding of the present invention.

TABLE 1

| ERROR CONDITION | MESSAGE |
| --- | --- |
| Unable to obtain IP address | "Your MTA cannot obtain a network address. Please contact XYZ Cable Company at 317-587-3168." Thank you." |
| Missing DHCP options | "Your MTA requires one or more missing DHCP options. Please contact XYZ Cable Company at 317-587-3168." Thank you." |
| MTA is provisioned but not enabled | "Your MTA has been administratively disabled. Please contact XYZ Cable Company at 317-587-3168." Thank you." |

Numerous modifications to and alternative embodiments of the present invention will be apparent to those skilled in the art in view of the foregoing description. Accordingly, this description is to be construed as illustrative only and is for the purpose of teaching those skilled in the art in carrying out the invention. Details of the embodiment may be varied without departing from the spirit of the invention, and the exclusive use of all modifications, which come within the scope of the appended claims is reserved.

What is claimed is:

1. A media terminal adaptor for use in a communication network adapted to have a telephone connected thereto, said media terminal adaptor comprising:

communication unit for connecting to a service provider provisioning server in a normal mode when the media terminal adaptor is in a provisioned state;

an audio message file for storing at least one of a fixed or dynamically generated diagnostic audio message and variable information (VI) for generating the dynamic portion of the diagnostic audio message;

provisioning failure detector for detecting when the media terminal adaptor has a non-provisioned status; and provisioning error message generator/player for generating and playing the diagnostic audio message through said telephone indicative of the detected non-provisioned status and providing corrective action to be taken by the user when an off-hook condition is detected when said telephone is taken off-hook.

2. The apparatus according to claim 1, wherein said provisioning error message generator/player comprises:

a speech decoder for converting digital audio data to analog samples; and plain-old-telephone-service (POTS) endpoint circuitry for reconstructing the analog samples and playing the reconstructed analog samples through said telephone when off-hook.

3. The apparatus according to claim 2, wherein said provisioning error message generator/player generates audio messages and transfers said messages to the telephone.

4. The apparatus according to claim 2, further comprising an off-hook detector for detecting when said telephone is taken off hook.

5. The apparatus according to claim 4, wherein said POTS endpoint circuitry and said off-hook detector monitor a hook state of said telephone and generate the diagnostic message when an off-hook condition is detected when said telephone is taken off-hook.

6. The apparatus according to claim 1, wherein said diagnostic message includes combined fixed voice audio with dynamically-generated voice audio.

7. The apparatus according to claim 1, wherein said diagnostic message includes tones.

8. The apparatus according to claim 1, wherein when operating in said normal mode, if said telephone is taken off-hook, dial tone is sent to said telephone.

9. The apparatus according to claim 1, further comprising a provisioning error resolver for determining a resolution to the detected non-provisioned status wherein said diagnostic message is a function of said resolution.

10. The apparatus according to claim 9, further comprising an electronic diagnostic and status information module adapted to be accessed by said telephone.

11. A method of generating and playing diagnostic messages by a media terminal adaptor having a telephone connected thereto, the method comprising the steps of:

storing at least one of a fixed or dynamically generated diagnostic audio message and variable information (VI) for generating the dynamic portion of the diagnostic audio message;

detecting a non-provisioned status of said media terminal adaptor; and generating and playing the diagnostic audio message through said telephone indicative of the detected non-provisioned status and providing corrective action to be taken by the user when an off-hook condition is detected when said telephone is taken off-hook.

12. The method according to claim 11, wherein the step of generating and playing includes the steps of:

converting digital audio data to analog samples by a speed decoder;

reconstructing by plain-old-telephone-service (POTS) endpoint circuitry the analog samples; and playing the reconstructed analog samples through said telephone by the POTS endpoint circuitry, when said telephone is taken off-hook.

13. The method according to claim 12, wherein the step of generating and playing includes the steps of:

generating audio messages by encapsulating audio in an real time protocol packet stream to emulate reception of data from a communications network, said packet stream comprises an ordered sequence of near-synchronous packets;

depacketizing said packet stream; and sending the depacketized packet steam to the speech decoder.

14. The method according to claim 12, further comprising the step of detecting when said telephone is taken off hook.

15. The method according to claim 11, wherein said diagnostic message includes combined fixed voice text with dynamically-generated voice text.

16. The method according to claim 11, wherein said diagnostic message includes tones.

17. The method according to claim 11, wherein the step of detecting said non-provisioned status includes the step of detecting an out-of-service status of said media terminal adaptor.

18. The method according to claim 11, further comprising the steps of:

determining a resolution to the detected non-provisioned status wherein said diagnostic message is a function of said resolution.

19. The method according to claim 18, further comprising the step of:

accessing electronic diagnostic and status information by said telephone identified in said diagnostic message.

20. The method according to claim 18, further comprising the steps of:

determining said media terminal adaptor is provisioned; and sending a dial tone to said telephone when the telephone is taken off-hook.

* * * * *

UNITED STATES PATENT AND TRADEMARK OFFICE
CERTIFICATE OF CORRECTION

| | |
|---|---|
| PATENT NO. | : 7,587,028 B1 |
| APPLICATION NO. | : 10/533978 |
| DATED | : September 8, 2009 |
| INVENTOR(S) | : Broerman et al. |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 622 days.

Signed and Sealed this

Twenty-first Day of September, 2010

David J. Kappos
*Director of the United States Patent and Trademark Office*